April 22, 1958    L. J. BECKHAM ET AL    2,831,801
PROCESS FOR THE RECOVERY OF ISOBUTANOL
FROM ALCOHOLIC MIXTURES
Filed Sept. 18, 1952

INVENTORS.
LELAND J. BECKHAM
HARRY L. HECKEL
BY Ernest A. Polin

ATTORNEY.

United States Patent Office 2,831,801
Patented Apr. 22, 1958

2,831,801

PROCESS FOR THE RECOVERY OF ISOBUTANOL FROM ALCOHOLIC MIXTURES

Leland J. Beckham, Bermuda District, Chesterfield County, and Harry L. Heckel, Hopewell, Va., assignors to Allied Chemical & Dye Corporation, New York, N. Y., a corporation of New York Application September 18, 1952, Serial No. 310,326

4 Claims. (Cl. 202—42)

This invention is directed to an improved process for recovering one or more higher alcohols from mixtures containing the same together with lower alcohols and water. More particularly, it relates to an improved process for recovering isobutanol.

In this specification and in the appended claims, by "higher alcohols" is meant alcohols containing at least 4 carbon atoms per molecule. The "lower alcohols" therefore, are alcohols containing less than 4 carbon atoms per molecule.

One source of the mixtures with which this invention is concerned is catalytic synthesis of methanol. Such synthesis normally produces higher alcohols in quantity sufficient to make their recovery commercially attractive. These higher alcohols ordinarily appear in condensed fractions obtained during fractionation of synthesis product to distill off methanol. Such fractions are complex mixtures of water and alcohols, both higher and lower. The water, as in other complex mixtures of this character, forms a number of azeotropes with the higher and lower alcohols and greatly complicates separation of one or more higher alcohols as such from the mixtures. For example, recovery of isobutanol from such mixtures by fractional distillation has heretofore required an elaborate and expensive fractionation process or has resulted in excessive losses of isobutanol.

It is an object of the present invention to provide an efficient and economical process for recovering one or more higher alcohols from mixtures containing the same together with lower alcohols and water. A further object is to provide an efficient and economical process for recovering isobutanol from such mixtures. A still further object is to remove a substantial amount of water and lower alcohols from such mixtures prior to distillation. Other objects will be apparent from the following description and the accompanying drawing.

In practice of the present invention, one or more higher alcohols are segregated by simple fractionation from a mixture of the type described if, prior to the fractionation, the mixture is subjected to treatment involving mixing therewith (1) an azeotrope former which forms low-boiling azeotropes with the lower alcohols and water, and (2) a controlled quantity of added water. The water may be added to the mixture either together with or before or after the addition of the azeotrope former. After allowing the total mixture to stand quiescent, an aqueous layer and a non-aqueous layer are formed. The aqueous layer containing the added water plus a substantial amount of water and lower alcohols present in the original mixture is removed from the system. The remaining non-aqueous layer containing substantially all of the higher alcohols and reduced quantities of water and lower alcohols is then fractionally distilled to produce the desired higher alcohol or higher alcohols as one or more condensed fractions.

We have discovered that efficient removal of water and lower alcohols prior to fractionation is accomplished if the added water is employed in amount to produce a mixture having a weight ratio of water to higher alcohols of not more than about 2.0:1, preferably about 0.3 to about 1.0:1, which mixture separates into two layers. Addition of water in greater amounts, we have found, defeats the purpose of the process by reducing yield of the desired higher alcohol or alcohols, even below the yields that may be achieved without the use of water.

The accompanying drawing is a diagrammatic flow sheet illustrating one method of practicing the invention. Referring to the drawing, the starting mixture containing desired higher alcohols along with lower alcohols and water is introduced through line 1 into mixing tank 2. If the mixture is a condensed fraction remaining from distillation of catalytic synthesis product to recover methanol, its content of higher alcohols will ordinarily be at least equal in weight to the amount of lower alcohols therein, and often will comprise a major proportion of higher alcohols and a minor proportion of lower alcohols plus water. Such mixtures typically consist of approximately 40 to 75% by weight of isobutanol together with other higher alcohols, 10 to 25% by weight of lower alcohols and 15 to 35% by weight of water. An azeotrope former which is miscible with the higher alcohols and immiscible with water and which forms low-boiling azeotropes with the lower alcohols and water, such as benzene, isopropyl ether, carbon tetrachloride or n-hexane, is added to mixing tank 2 through line 3. Water is added to mixing tank 2 through line 4 in amount to produce a mixture having a weight ratio of water to higher alcohols of not more than about 2.0:1, preferably about 0.3 to about 1.0:1. Conditions in the mixing tank are conveniently maintained at atmospheric temperature and pressure.

After thoroughly mixing the materials in mixing tank 2, the resulting mixture passes through line 5 to decanter 6 where it is allowed to separate into two layers. The lower or aqueous layer containing the added water plus a substantial amount of the water and lower alcohols present in the original mixture is decanted through line 7 to waste storage tank 8. The upper or non-aqueous layer, containing practically all of the higher alcohols and reduced quantities of water and lower alcohols, is pumped by pump 9 through line 11 to heater 13 containing closed steam coils 14. A valve 12 controls line 11 and may be closed after introduction of the non-aqueous layer into heater 13. Upon the application of heat to the non-aqueous layer, vaporous components are evolved and pass through line 15 to a fractionating column 16 which may be of any convenient design, preferably the bubble-cap type. Liquid collecting in the bottom of fractionating column 16 flows by gravity through line 17 to bottoms receiver 18. A portion of this liquid is pumped by pump 19 through line 21 back through heater 13 for the purpose of supplying part of the heat required in operation of fractionating column 16. Heater 13 is provided with a valved line 13a to take care of any build-up in the heater of the non-aqueous layer. If desired, the recirculated liquid may be heated in a separate heater and returned to column 16 independent of the introduction of fresh charge to the same. Other conventional means, such as the fractionating column and a heater section embodied in the fractionating column, may be employed in lieu of the combination of column 16 and external heater 13 illustrated in the drawing. The fractionating column functions satisfactorily under atmospheric or reduced pressure, however, for simplicity, it is preferred to operate the column under ordinary existing atmospheric conditions.

During operation fractionating column 16 produces a plurality of successively higher-boiling cuts or fractions. By preference the first fraction has controlled end point such that it includes all or substantially all of the water, lower alcohols and azeotrope former contained in the fractionaction charge, but very little, if any, of the higher alcohols. Higher-boiling components, including the higher alcohols present in the charge, are then recovered as one or more subsequent cuts. A portion or all of the lower-boiling fraction may be returned to mixing tank 2 to be mixed with fresh charge, thereby providing within mixture to be fractionated at least a substantial proportion of the azeotrope former required for the next run. If desired, part or all of the higher-boiling fractions not removed as desired product may also be returned to mixing tank 2.

Referring to the particular distillation method disclosed in the drawing, the first distillation fraction, boiling in the range of 58° to 75° C. and containing all the water and lower alcohols in the column feed together with most of the azeotrope former and small amounts of isobutanol, passes from condenser 23 (cooled by water entering line 24 and being discharged through line 25) via lines 26, 27 and 28 to first fractionation receiver 29. In receiver 29, the first fraction separates into two layers, a lower aqueous layer and an upper non-aqueous layer. The aqueous layer passes through line 31 to waste storage tank 8 while a portion or all of the non-aqueous layer passes through valved line 32 to recycle storage tank 33, and then through line 34 to mixing tank 2 for incorporation with fresh charge. Residual non-aqueous layer may be removed from the system through valved line 32a. The second distillation fraction, boiling in the range of 75° to 90° C. and containing most of the remaining azeotrope former and small amounts of isobutanol, passes through condenser 23 via lines 26, 27 and 35 to second fraction receiver 36. The third distillation fraction, boiling within the range 90° to 106° C. and containing the residual azeotrope former and small amounts of isobutanol, passes from condenser 23 via lines 26, 27 and 38 to third fraction receiver 39. The fourth distillation fraction, boiling in the range of 106 to 109.5° C. and containing isobutanol product, passes from condenser 23 via lines 26, 27 and 42 to fourth fraction receiver 43. From receiver 43, the isobutanol product passes through line 44 to an isobutanol storage tank 45. The fifth distillation fraction, boiling within the range of 109.5° to 115° C. and containing the remaining isobutanol and a small amount of higher alcohols other than isobutanol, passes from condenser 23 via lines 26, 27 and 46 to fifth fraction receiver 47. Lines 28, 35, 38, 42 and 46 are supplied with respective valves 49, 51, 52, 53 and 54 so that by adjustment of the valves only one line is open at each particular stage of fractionation. A portion or all of the second, third and fifth fractions may pass through valved lines 37, 41 and 48, respectively, to recycle storage tank 33, and then through line 34 to mixing tank 2 for incorporation with fresh charge. As required or desired, part or all of these fractions may be removed from the system through valved lines 37a, 41a and 48a respectively. The bottoms remaining in the fractionation column and containing alcohols higher than isobutanol are drawn off through line 17 to receiver 18.

The material in waste storage tank 8 may be distilled, taking off about 20% of the charge as overhead boiling in the range of 58° to 90° C. The overhead containing essentially all the organic compounds may then be added to the bottoms collected in receiver 18 and burned for fuel or further purified for other purposes. The bottoms from this waste distillation may then be wasted to the sewer.

Suitable pumps, valves, pressure controls, etc. may be provided for carrying out our operation as will be apparent to those skilled in the art.

The following examples illustrate the present invention. Parts are by weight:

*Example 1.*—Crude isobutanol obtained as a by-product during the preparation of methanol by catalytic synthesis of carbon monoxide and hydrogen and containing 105.6 parts of isobutanol, 27.2 parts of $C_4$–$C_8$ alcohols (exclusive of isobutanol), 12.2 parts of methanol, 0.4 part of ethanol, 6.2 parts of n-propanol and 26.9 parts of water, is introduced into a mixing tank maintained at atmospheric temperature and pressure. Also introduced into the tank is recycle material containing 28.7 parts of isobutanol, 0.1 part of $C_4$–$C_8$ alcohol (exclusive of isobutanol), 1.1 parts of methanol, 16.0 parts of n-propanol, 164.3 parts of benzene and 1.6 parts of water.

105.9 parts of water and 1.2 parts of benzene are then fed to the mixing tank, thereby obtaining a mixture in which the weight ratio of water to higher alcohols is 0.83 to 1. The mixture is stirred thoroughly and allowed to separate into two layers. The lower or aqueous layer containing 2.0 parts of isobutanol, 0.1 part of $C_4$–$C_8$ alcohols (exclusive of isobutanol), 8.9 parts of methanol, 0.4 part of ethanol, 4.5 parts of n-propanol, 1.0 part of benzene and 123.3 parts of water is decanted into a waste storage tank. The upper or benzene layer containing 132.3 parts of isobutanol, 27.2 parts of $C_4$–$C_8$ alcohols (exclusive of isobutanol), 4.4 parts of methanol, 17.7 parts of n-propanol, 164.5 parts of benzene and 11.1 parts of water is passed to a bubble-type fractionation column having 15 plates and maintained at atmospheric pressure.

The above data show that of 28.5 parts of water and 35.9 parts of lower alcohols present in the crude isobutanol and recycle charge, only 11.1 parts of water and 22.1 parts of lower alcohols reach the fractionation column. That is, about 61% of the water and about 38% of the lower alcohols are removed from the system prior to distillation.

Distillation is started at about 1:1 reflux ratio and a forecut distilling over between 58° and 75° C. is removed. The forecut is allowed to separate into two layers. The lower or water layer containing 0.1 part of isobutanol, 3.3 parts of methanol, 1.7 parts of n-propanol, 0.2 part of benzene and 9.5 parts of water is sent to the waste storage tank. The upper or benzene layer containing 16.2 parts of isobutanol, 1.1 parts of methanol, 16.0 parts of n-propanol, 127.1 parts of benzene and 1.6 parts of water is sent to a recycle storage tank for incorporation into the next run. A fraction containing 3.2 parts of isobutanol and 32.4 parts of benzene is then distilled over between 75° and 90° C. at about 1:1 reflux ratio. This fraction is also sent to the recycle storage tank. The reflux ratio is now increased to about 6:1, and a fraction containing 5.9 parts of isobutanol and 4.8 parts of benzene is distilled over at 90° to 106° C. and then sent to the recycle storage tank. The reflux ratio is now lowered to about 2:1, and 103.5 parts of the product isobutanol are distilled over between 106° and 109.5° C. and collected in a storage tank for shipment to the trade for use in organic synthesis, as solvents, in the formulation of coating materials, plasticizers, hydraulic brake fluids, etc. This amount of isobutanol represents 77.1% of the isobutanol present in the total charge. Another fraction containing 3.4 parts of isobutanol and 0.1 part of $C_4$–$C_8$ alcohols (exclusive of isobutanol) is distilled over between 109.5° to 115° C. at about a 10:1 reflux ratio and sent to the recycle storage tank. 27.1 parts of $C_4$–$C_8$ alcohols (exclusive of isobutanol) are recovered as bottoms of the distillation.

*Example 2.*—Crude isobutanol of the type employed in Example 1, containing 105.6 parts of isobutanol, 27.2 parts of $C_4$–$C_8$ alcohols (exclusive of isobutanol), 12.2 parts of methanol, 0.4 part of ethanol, 6.2 parts of n-propanol and 26.9 parts of water, is introduced into a mixing tank maintained at atmospheric temperature and pressure. Recycle material containing 54.2 parts of isobutanol, 0.1 part of $C_4$–$C_8$ alcohols (exclusive of isobutanol), 2.0 parts of methanol, 23.7 parts of n-propanol, 224.7 parts of benzene and 2.4 parts of water is also introduced into the tank.

26.5 parts of water and 2.0 parts of benzene are then fed to the tank, thereby producing a mixture having a weight ratio of water to higher alcohols of 0.3 to 1. After thorough stirring of the mixture, it is allowed to separate into two layers. The lower, aqueous layer containing 3.8 parts of isobutanol, 0.1 part of $C_4$–$C_8$ alcohols (exclusive of isobutanol), 6.2 parts of methanol, 0.4 part of ethanol, 3.0 parts of n-propanol, 1.6 parts of benzene and 35.9 parts of water is decanted into a waste storage tank. The upper, benzene layer containing 156.0 parts of isobutanol, 27.2 parts of $C_4$–$C_8$ alcohols (exclusive of isobutanol), 8.0 parts of methanol, 26.9 parts of n-propanol, 225.1 parts of benzene and 19.9 parts of water is passed to a bubble-type fractionation column having ten plates and maintained at atmospheric pressure.

The above data show that of 29.3 parts of water and 44.5 parts of lower alcohols present in the crude isobutanol and recycle charge, only 19.9 parts of water and 34.9 parts of lower alcohols reach the fractionation column. That is, about 32% of the water and about 22% of the lower alcohols are removed from the system prior to distillation.

Distillation is carried out as in Example 1, and 101.4 parts of product isobutanol distilling at 106°–109.5° C. are collected in a storage tank for shipment. This amount of isobutanol represents 63.5% of the isobutanol present in the total charge.

It is to be noted that in the above examples, weight ratios of azetrope former to higher alcohols of 1.02 to 1 (Example 1) and 1.21 to 1 (Example 2) are effectively employed. However, higher or lower weight ratios of azeotrope former to higher alcohols may be employed in the process of our invention depending upon the percentage of individual components in the mixture to be treated.

The foregoing description of our invention is not to be taken as limiting our invention, but only as illustrative thereof since many variations may be made by those skilled in the art without departing from the scope of the following claims. For example, it will be obvious to those skilled in the art that the present invention may be carried out in a continuous manner as well as batchwise.

This application is a continuation-in-part of our copending application Serial No. 240,836, filed August 8, 1951.

We claim:

1. A process for recovering isobutanol from a mixture containing a major proportion of isobutanol together with other higher alcohols containing at least 4 carbon atoms per molecule and a minor proportion of lower alcohols containing from 1 to 3 carbon atoms per molecule plus water which comprises mixing with the mixture (1) an azeotrope former which forms low-boiling azeotropes with the lower alcohols and water, and (2) added water in amount to produce a mixture having a weight ratio of azeotrope former to higher alcohols of at least about 1:1 and a weight ratio of water to higher alcohols of not more than about 2.0:1 which mixture separates into two layers, an aqueous layer containing the added water plus a substantial amount of the water and lower alcohols present in the original mixture and a non-aqueous layer containing substantially all of the higher alcohols, separating the aqueous layer, subjecting the non-aqueous layer to fractional distillation to remove therefrom constituents boiling lower than the isobutanol and separately recovering the isobutanol.

2. A process for recovering isobutanol from a mixture containing a major proportion of isobutanol together with other higher alcohols containing at least 4 carbon atoms per molecule and a minor proportion of lower alcohols containing from 1 to 3 carbon atoms per molecule plus water which comprises mixing benzene and added water with the mixture in amount to produce a mixture having a weight ratio of benzene to higher alcohols of at least about 1:1 and a weight ratio of water to higher alcohols of about 0.3 to about 1.0:1 which mixture separates into two layers, an aqueous layer containing the added water plus a substantial amount of the water and lower alcohols present in the original mixture and a benzene layer containing substantially all of the higher alcohols, separating the aqueous layer, subjecting the benzene layer to fractional distillation to remove therefrom constituents boiling lower than the isobutanol and separately recovering the isobutanol.

3. A process for recovering isobutanol from a mixture containing a major proportion of isobutanol together with other higher alcohols containing at least 4 carbon atoms per molecule and a minor proportion of lower alcohols containing from 1 to 3 carbon atoms per molecule plus water which comprises mixing benzene and added water with the mixture in amount to produce a mixture having a weight ratio of benzene to higher alcohols of at least about 1:1 and a weight ratio of water to higher alcohols of about 0.3 to about 1.0:1 which mixture separates into two layers, an aqueous layer containing the added water plus a substantial amount of the water and lower alcohols present in the original mixture and a benzene layer containing substantially all of the higher alcohols, separating the aqueous layer, subjecting the benzene layer to fractional distillation to remove therefrom a fraction boiling lower than the isobutanol and containing substantially all of the benzene and a separately recoverable fraction containing the isobutanol and mixing at least a portion of the first fraction with fresh mixture to be treated.

4. A process for recovering isobutanol from a mixture containing a major proportion of isobutanol together with other higher alcohols containing at least 4 carbon atoms per molecule and a minor proportion of lower alcohols plus water which comprises mixing benzene and added water with the mixture in amount to produce a mixture having a weight ratio of benzene to higher alcohols of at least about 1:1 and a weight ratio of water to higher alcohols of about 0.3 to about 1.0:1 which mixture separates into two layers, an aqueous layer containing the added water plus a substantial amount of the water and lower alcohols present in the original mixture and a benzene layer containing substantially all of the higher alcohols, separating the aqueous layer, subjecting the benzene layer to fractional distillation to remove therefrom a fraction boiling lower than the isobutanol and forming two layers, an aqueous layer and a non-aqueous layer containing substantially all of the benzene, and a separately recoverable fraction containing the isobutanol, separating the aqueous layer of the first-named fraction and mixing at least a portion of the non-aqueous layer thereof with fresh mixture to be treated.

References Cited in the file of this patent

UNITED STATES PATENTS

| | | |
|---|---|---|
| 1,422,583 | Lebo | July 11, 1922 |
| 1,454,462 | Backhaus | May 8, 1923 |
| 1,524,192 | Mann | Jan. 27, 1925 |
| 1,712,475 | Buc | May 7, 1929 |

(Other references on following page)

UNITED STATES PATENT OFFICE
CERTIFICATE OF CORRECTION

Patent No. 2,831,801                              April 22, 1958

Leland J. Beckham et al.

It is hereby certified that error appears in the printed specification of the above numbered patent requiring correction and that the said Letters Patent should read as corrected below.

Column 4, line 14, for "carton" read -- carbon --; column 5, line 43, for "azetrope" read -- azeotrope --; column 6, line 48, after "alcohols" insert -- containing 1 to 3 carbon atoms per molecule --.

Signed and sealed this 2nd day of December 1958.

(SEAL)
Attest:

KARL H. AXLINE                                  ROBERT C. WATSON
Attesting Officer                                Commissioner of Patents